United States Patent [19]

Tetenborg et al.

[11] 4,300,600
[45] Nov. 17, 1981

[54] METHOD AND APPARATUS FOR FILLING SACKS WITH AN AMOUNT OF POURABLE MATERIAL DETERMINED BY THEIR WEIGHT

[75] Inventors: Konrad Tetenborg, Lengerich; Hermann Oelrich, Ladbergen, both of Fed. Rep. of Germany

[73] Assignee: Windmoller & Holscher, Lengerich, Fed. Rep. of Germany

[21] Appl. No.: 96,214

[22] Filed: Nov. 20, 1979

[30] Foreign Application Priority Data

Nov. 22, 1978 [DE] Fed. Rep. of Germany ....... 2850668

[51] Int. Cl.³ .............................................. B65B 1/32
[52] U.S. Cl. ..................................... 141/10; 53/502; 141/83; 141/114; 141/128; 141/317; 177/122
[58] Field of Search ................. 53/459, 473, 570, 502; 141/10, 68, 83, 93, 114, 128, 166, 265, 281, 282, 284, 285, 315–317; 177/122

[56] References Cited

U.S. PATENT DOCUMENTS

| | | | |
|---|---|---|---|
| 2,833,105 | 9/1958 | Brown | 144/10 X |
| 3,788,368 | 1/1974 | Geng et al. | 177/122 X |
| 3,830,266 | 8/1974 | Hudson | 141/10 |
| 4,211,263 | 7/1980 | Kennedy et al. | 177/122 X |

FOREIGN PATENT DOCUMENTS 2020618 11/1979 United Kingdom .

Primary Examiner—Frederick R. Schmidt
Attorney, Agent, or Firm—Fleit & Jacobson

[57] ABSTRACT

Large capacity sacks are successively suspended from holding devices by their mouths and filled with pourable material through a conduit equipped with a dispensing mechanism. During filling, the sack comes to rest on a support which is part of weighing apparatus for controlling the dispensing mechanism. Before the sack contents have reached a predetermined final weight, the holding devices are lowered to relax the sack wall above the level of the contents, whereupon filling is completed at a trickle rate.

6 Claims, 7 Drawing Figures

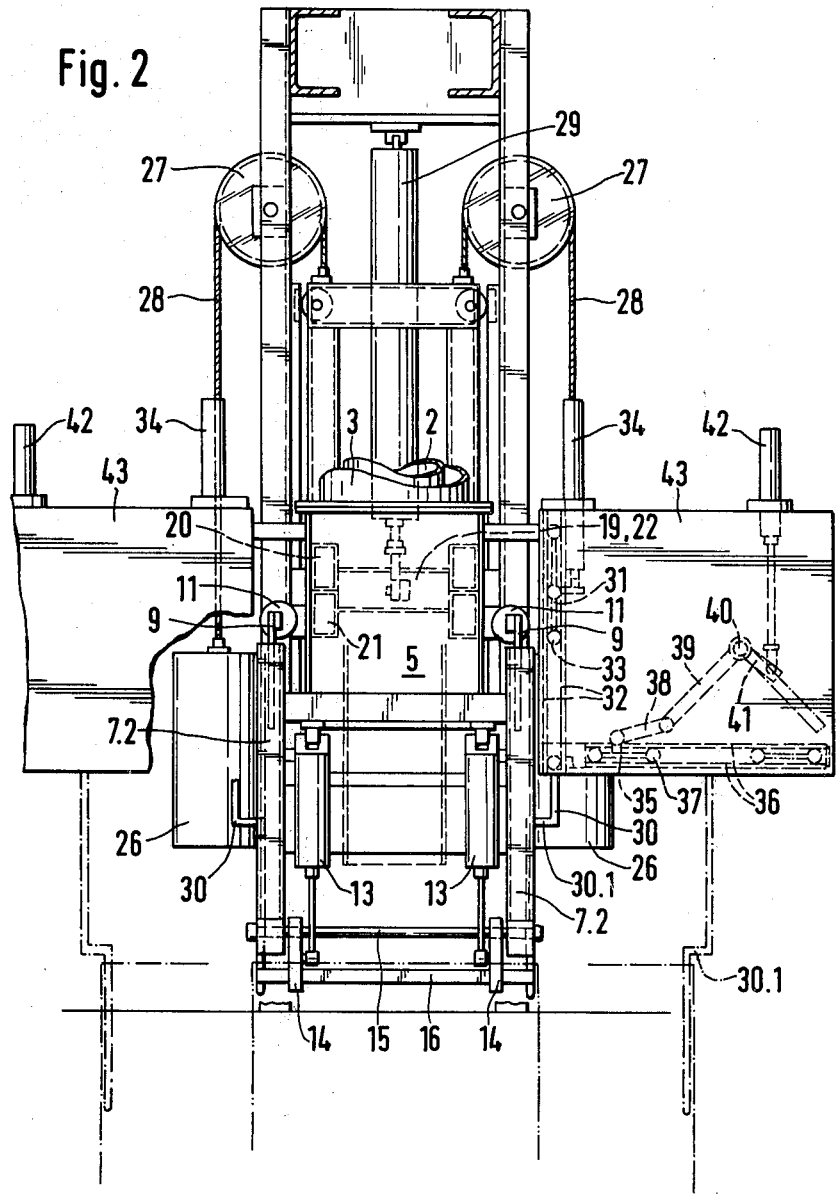

METHOD AND APPARATUS FOR FILLING SACKS WITH AN AMOUNT OF POURABLE MATERIAL DETERMINED BY THEIR WEIGHT

The invention relates to a method of filling sacks with an amount of pourable material determined by their weight, wherein the opened sack suspended from a sack holder is fed with the pourable material through a pouring tube in dispensed form, and to an apparatus for performing this method.

It is known to feed the contents for large sacks through dispensing means disposed above the filling funnel. Such dispensing means are complicated and require many parts and are therefore expensive and prone to become defective. In addition, the control of such dispensing means requires electrotechnical computers.

It is the problem of the present invention to provide a method and apparatus with which sacks to be filled can be simply and accurately fed with the contents by an amount determined by weight.

According to the invention, this problem is solved in a method of the aforementioned kind in that during filling the sack is stood on a support in the form of a force receiver of weighing apparatus and the sack holder is lowered before completed filling to an extent such that the wall of the sack is relaxed near the mouth, and that the remaining amount of pourable material is supplied at reduced flow until the weighing apparatus signals that the filled weight has been reached. According to the method of the invention, the filled weight is determined by a gross weighing apparatus on which the sack to be filled is deposited. The gross weighing apparatus permits a more accurate determination of weight in a simpler manner than do the known dispensing means and can be employed in a simple manner to control the flow for filling the sack. Disrupting influences during weighing are eliminated in that the sack holder is lowered to such an extent during feeding of the remaining amount of contents up to reaching the filled weight that the wall of the sack becomes slack in the vicinity of the filling aperture. The weighing apparatus may produce digital or analogue signals which control the amount of flow for filling the sack by way of interposed amplifiers and computer units. Further, a display device may be provided for indicating the gross weight.

An apparatus for performing the method and comprising a sack holder clamping the sack beneath the filling funnel and a pouring tube provided with dispensing means is characterised according to the invention in that below the sack holder there is a horizontal support for the sack forming the force receiver of weighing apparatus, that a control governed by the weighing apparatus is provided for the dispensing means, and that the sack holder is lowerable.

Further embodiments of the invention have been described in subsidiary claims 3 to 5.

An example of the invention will now be described in more detail with reference to the drawing, wherein:

FIG. 2 is a front elevation of the FIG. 1 apparatus;

Figure 1:
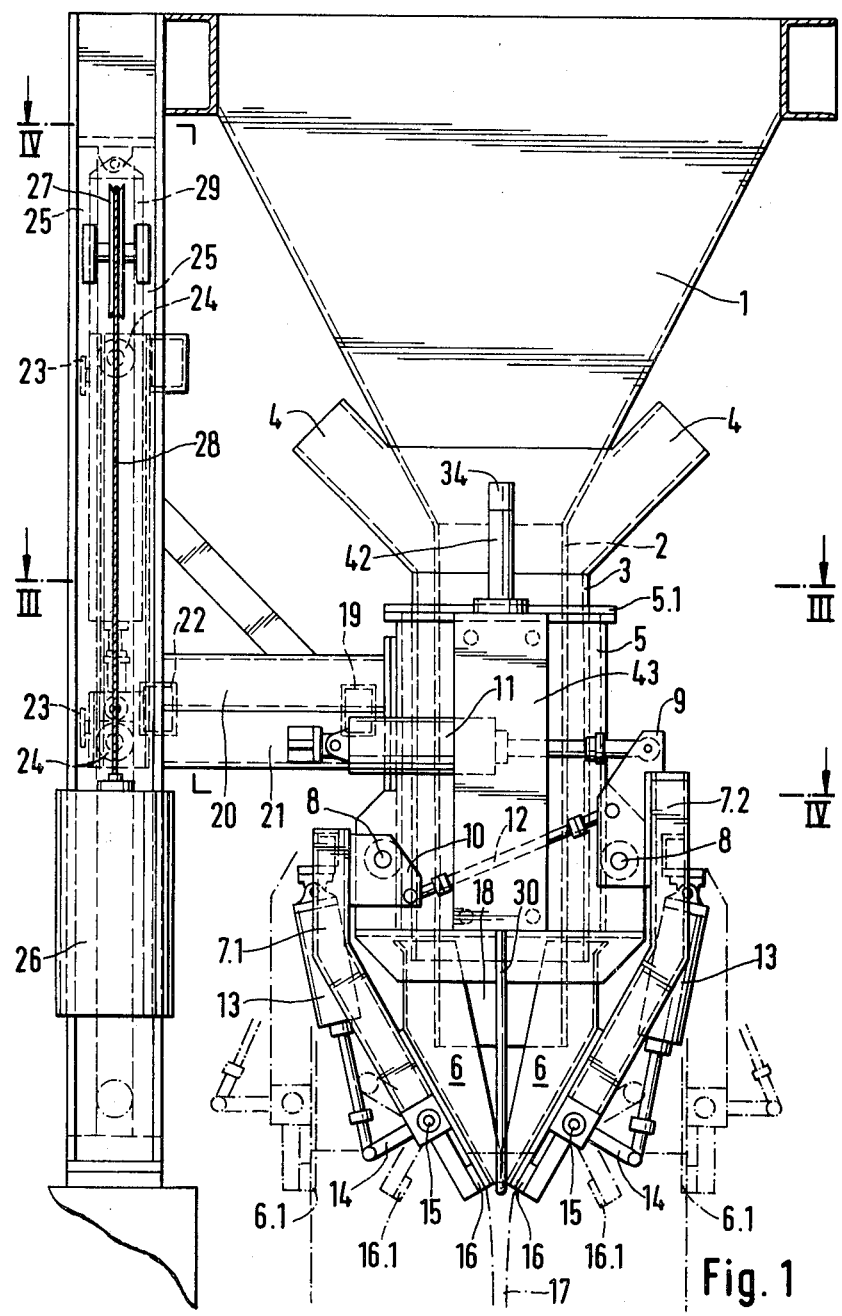
FIG. 1 is a side elevation of the pouring funnel with pouring tube and filling funnel.
Figure 4:
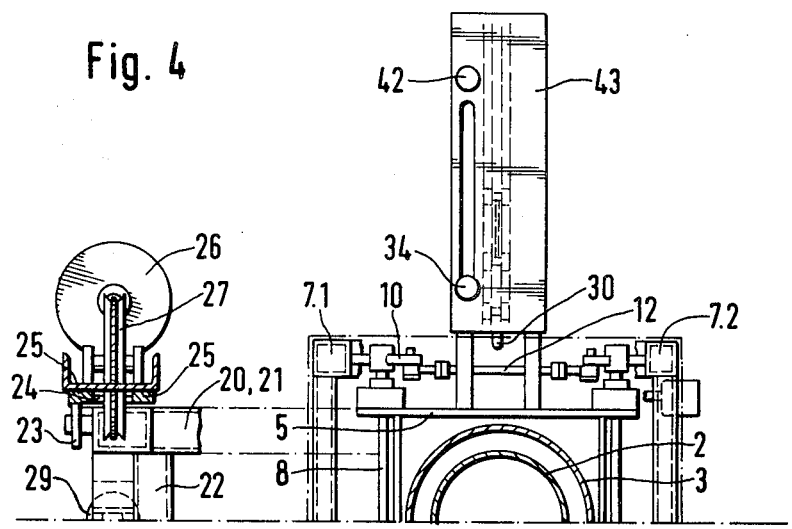
FIG. 4 is a section on the line IV—IV in FIG. 1.
Figure 3:
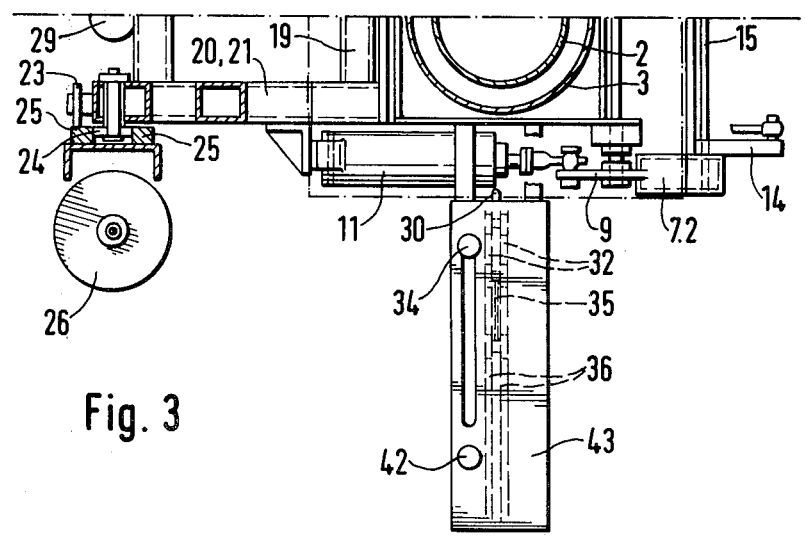
FIG. 3 is a section through the apparatus on the line III—III in FIG. 1.

A pouring tube 2 secured to a fixed pouring funnel 1 is surrounded by a suction tube 3 for extracting dust arising during filling of the large sack. Adjoining the suction tube 3 there are suction nipples 4 which are connected to a source of suction air (not shown). The suction tube 3 is surrounded by a rectangular tube 5 which carries filling funnel segments 6 and the mechanism for opening and closing same and is closed by a cover plate 5.1 which sealingly abuts the suction tube 3. Two levers 7.1 and 7.2 secured to each of the filling funnel segments 6 are rigidly connected to shafts 8 rotatably mounted in the rectangular tube 5. Connected to the shafts 8 or the levers 7 there are further levers 9, 10, namely the levers 9 connected to the levers 7.2 and the levers 10 connected to the levers 7.1. The levers 9 are hinged to the piston rods of piston-cylinder units 11 of which the cylinders are pivoted to the rectangular tube 5. Connecting rods 12 are so hinged to the levers 9 and 10 that, on actuating the piston-cylinder units 11, the levers 7.1 are swung to the left and the levers 7.2 to the right, the filling funnel segments 6 being swung out of the closed position shown in FIG. 1 to an open position.

The cylinders of piston-cylinder units 13 are pivoted to the levers 7.1, 7.2, their piston rods being pivoted to crank levers 14. The crank levers 14 are secured on shafts 15 which are rotatably mounted in the levers 7.1 and 7.2, respectively. The other free ends of the crank levers 14 are screw-connected to pressure bars 16. By actuating the piston-cylinder units 13, the pressure bars 16 can be swung away to a position 16.1 shown in chain-dotted lines or pressed against the filling funnel segments 6 in the position shown in full lines. In the latter position, they securely hold the mouth of a large sack 17 brought up by a supply device.

After the large sack 17 has been received, the filling funnel segments 6 are splayed apart to a position 6.1 shown in chain-dotted lines by means of the piston-cylinder units 11, the mouth of the large sack 17 participating in this movement so that the sack can now be filled with material fed through the pouring funnel 1 and the pouring tube 2. During filling, the dust that is created is extracted through the suction tube 3 and suction nipples 4. To provide a good seal against false air, an elastic web 18 is stretched between the filling funnel segments 6; it may be of rubber or like material and participates in the further spreading of the filling funnel segments 6 by being elastically deformed.

The rectangular tube 5 is welded or screwed to further rectangular tubes 19 to 22. At the ends of the rectangular tubes 20, 21 remote from the rectangular tube 5, guide rollers 23, 24 are loosely rotatably mounted and these run in or on fixed guide tracks 25 whereby the rectangular tube 5 and the large sack 17 suspended from the filling funnel segments 6 are liftable or lowerable during the filling step.

To balance the weight of the rectangular tube 5 and the parts connected thereto, counterweights 26 are secured to cables 28 passing over direction-changing rollers 27 rotatably mounted in the frame, the free ends of the cables being secured to the frame.

A piston-cylinder unit 29 has its cylinder secured to the frame and its piston rod pivoted to the rectangular tube 22. By actuating the piston cylinder unit 29, the rectangular tube 5 and the filling funnel segments 6 can be lowered to such an extent that the parts of the sack wall disposed above the filling level in the filled sack 17 are applied to the contents and the mouth or upper sack wall portions can be laid flat.

For the purpose of laying flat or pulling the mouth apart, there are vertically downwardly directed rods 30 which enter the mouth to only a small extent during the filling step. Because of shortage of space, they are flanged (30.1) and secured to carriages 31 guided between guide rails 32 by means of rollers 33. By means of piston-cylinder units 34 secured to the guide rails 32 and having piston rods connected to the carriages 31, the rods 30 can be lowered and raised. The guide rails 32 are secured to carriages 35 carrying rotatably mounted rollers 37 which run between guide rails 36.

The free ends of levers 38 pivoted to the carriages 35 are hinged to levers 39 keyed to a shaft 40. Levers 41 secured to the shafts 40 are engaged by the piston rods of piston-cylinder units 42 of which the cylinders are pivotably mounted in a housing 43 secured to the rectangular tube 5. The shafts 40 are also rotatably mounted in the housings 43 and the guide rails 36 are secured therein.

Figure 5:
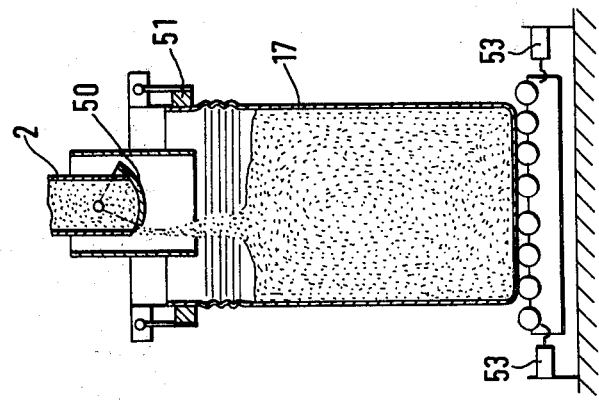
FIG. 5 is a diagrammatic representation of the sack suspended from the sack holder of the FIGS. 1 to 4 apparatus with a horizontal support disposed therebelow.
Figure 6:
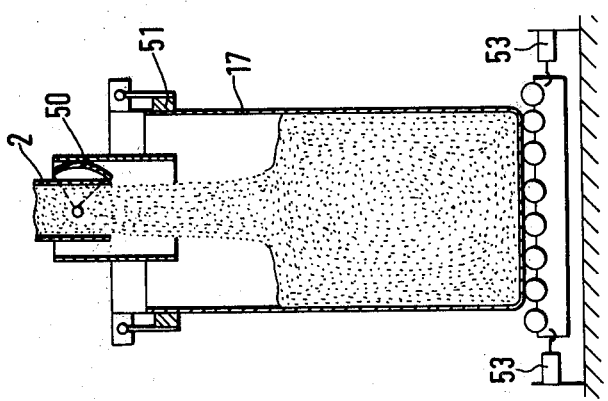
FIG. 6 is a view corresponding to FIG. 5 of the partially filled sack deposited on the support and FIG. 7 is a view corresponding to those of FIGS. 5 and 6 of the sack when being filled with material at a trickle rate and with the mouth held slack.
Figure 7:
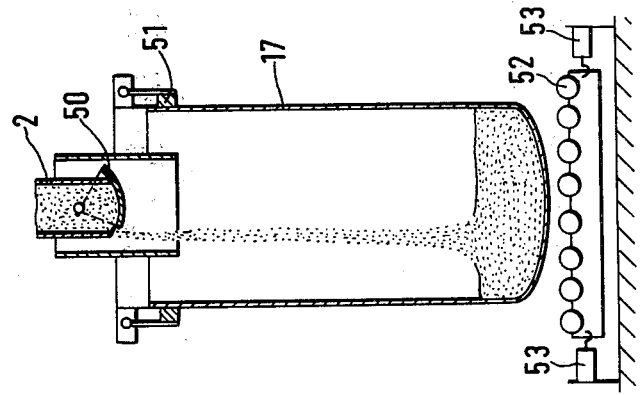

The pouring tube 2 diagrammatically illustrated in FIGS. 5 to 7 is provided with a flap 50 which controls the amount of flow, is completely closed when a sack is changed and can be entirely or partially opened by control means (not shown) depending upon the desired amount of flow.

FIGS. 5 to 7 illustrate the following functional sequence.

After the sack 17 has been suspended from the diagrammatically illustrated sack holder 51 formed by the pressure bars 16 as well as the filling funnel segments 6, the flap 50 is partially opened to permit a fine flow of pourable material to enter the sack 17. After the contents have attained a weight corresponding to the weight of the counterweights 26 less the weights of the movable parts of the filling apparatus, for example 150 kp, the sack 17 drops onto the support 52 carrying same. In the illustrated example, the support 52 is in the form of a roller track which enables the filled sack to be readily pushed to other operating stations, for example a station for closing the sack.

The section of the roller track supporting the sack 17 below the filling apparatus is supported from the frame of the filling apparatus or from the floor of the factory by bending rod springs 53 which serve as force receivers of a gross weighing apparatus. Bending of the bending rod springs 53 can for example be measured by strain gauge strips (not shown) which are stuck to the bending rod springs 53. The voltage changes effected by the strain gauge strips and analogous to the gross weight can be transmitted to a rotary coil instrument or an intermediate circuit so that the weight of the sack can be read off or the flap 50 can be controlled according to the amount of contents that is still missing.

After the base of the sack 17 has been formed to the correct shape by introducing part of the contents and the sack 17 has been deposited on the support 52, the flap 50 is opened fully as shown in FIG. 6 and a coarse flow is directed into the sack 17. In this position, the wall of the sack is still held taut by the action of the counterweights 26.

If the sack is, for example, to be filled with an amount of 1 t of material, the flap 50 is set to trickle flow as shown in FIG. 7 as soon as the gross weighing apparatus indicates a sack weight of for example 800 kp. However, at this time the sack 17 does not hold 800 kp of pourable material because the gross weighing apparatus is, on account of the pull on the sack walls as a result of the counterweights 26, relieved by the assumed weight of 150 kp of material. In the assumed example, therefore, the sack would already hold 950 kp of material. To exclude the effect of the counterweights 26 and permit accurate weighing, the piston cylinder unit 29 is actuated to lower the sack holder 51 to such an extent that the wall of the sack becomes slack in the vicinity of the mouth. The remaining 50 kp of pourable material are then supplied at a trickle flow until the weighing apparatus shows that the final weight has been reached and the control devices connected thereto are effective to close the flap 50.

We claim:

1. A method of filling sacks with a first predetermined weight of material comprising:
    gripping and suspending an opened sack from a sack holder;
    applying a force to the sack holder so that the gripped sack is held spaced from and above a support surface of a weighing apparatus;
    introducing pourable material into the sack at a first feed rate so that the sack holder is moved against the applied force by the weight of material in the suspended sack to position the sack holder on the support surface of the weighing apparatus;
    weighing the sack after its positioning on the support surface and introducing pourable material into the sack at a second feed rate;
    moving the sack holder towards the support surface when the sack weight reaches a second predetermined weight less than said first predetermined weight so that upper portions of the sack walls are relaxed whereby the applied force does not effect the measured weight and the entire weight of the sack and its contents are supported by the support surface; and
    introducing pourable material into the sack at a feed rate less than said second feed rate until the weighing apparatus indicates the first predetermined weight has been reached.

2. A method according to claim 1, wherein said first feed rate is less than said second feed rate.

3. A method according to claim 1, wherein the applied force is selected such that the bottom of the sack is fully expanded before the sack is positioned on the support surface.

4. An apparatus for filling sacks with a predetermined weight of pourable material comprising:
    means for clamping a sack to be filled;
    means for introducing material into the clamped sack;
    means for weighing the clamped sack, said means for weighing including support means for supporting the bottom of the sack;
    means for applying a predetermined force to said means for clamping so that a clamped empty sack is vertically spaced above said means for supporting, said force being such that the bottom of the sack is moved into contact with said means for supporting after the bottom of the sack has been expanded by material introduced into the sack;

means for moving said means for clamping towards said means for supporting so that upper portions of the sack walls are relaxed whereby said predetermined force has no effect on the measured weight; and means for controlling the rate of introduction of material into the clamped sack, so that the material is introduced at a first rate when the sack is spaced from the means for supporting, is introduced at a second rate after the bottom of the sack initially contacts the means for supporting, and is introduced at a third rate after upper portions of the sack walls are relaxed, the third rate being less than the second rate.

5. An apparatus according to claim 4, wherein said means for introducing includes a pouring tube and wherein said means for controlling comprises means for changing the size of a flow path extending through said pouring tube.

6. An apparatus according to claim 4, wherein said means for applying a predetermined force comprises a counterweight connected to said means for clamping for moving said means for clamping in an upward direction.

* * * * *